United States Patent [19]

Kaga et al.

[11] Patent Number: 4,999,561
[45] Date of Patent: Mar. 12, 1991

[54] VARIABLE-SPEED DRIVING SYSTEM

[75] Inventors: Atsushi Kaga; Masahiko Nakamoto, both of Amagasaki, Japan

[73] Assignee: Mitsubishi Denki Kabushiki Kaisha, Japan

[21] Appl. No.: 531,689

[22] Filed: Jun. 1, 1990

[30] Foreign Application Priority Data

Feb. 6, 1989 [JP] Japan ................... 1-141795

[51] Int. Cl.⁵ ............................................. H02P 5/40
[52] U.S. Cl. ................... 318/812; 318/798; 318/803; 318/811; 363/71
[58] Field of Search ............................... 318/798–822; 363/40, 41, 42, 71, 72

[56] References Cited

U.S. PATENT DOCUMENTS 4,392,099  7/1983  Kuniyoshi ........................... 318/797
4,503,316  3/1985  Murase et al. ..................... 363/71 X
4,644,458  2/1987  Harafuji et al. .................... 363/71 X
4,680,525  7/1987  Kobari et al. ...................... 318/798 X Primary Examiner—Paul Ip
Attorney, Agent, or Firm—Leydig, Voit & Mayer

[57] ABSTRACT

A variable-speed driving system for 3-phase induction motor by potential-dividing D.C. power from a D.C. power supply into two D.C. powers, converting these two D.C. powers into 3-phase A.C. powers by means of series-connecting 3-phase inverters and delivering the 3-phasse A.C. powers to respective windings of the 3-phase induction motor. In order to equalize the output powers of the series-connected 3-phase inverters, circuits are provided which are operative in accordance with the voltage difference between the voltages input to said 3-phase inverters so as to control the modulation factors of the 3-phase inverters in the variable voltage/-variable frequency mode and to control the voltages input to the 3-phase inverters in the constant voltage/-variable frequency mode.

4 Claims, 2 Drawing Sheets

VARIABLE-SPEED DRIVING SYSTEM

BACKGROUND OF THE INVENTION

1. Field of the Invention

The present invention relates to a variable-speed driving system for driving a 3-phase induction motor mounted on an electric car.

2. Description of the Relates Art

FIG. 1 is a circuit diagram of a variable-speed driving system disclosed, for example, in Japanese Patent Laid-Open No. 63-23589. Referring to this Figure, 3-phase-inverters 6 and 7 are series-connected to a DC power supply 1 of, for example, 750 V, through a breaker 2 and a filter reactor 3. A filter capacitor 4 is connected to the input side of the inverter 6 in parallel therewith. Similarly, a filter capacitor 5 is connected to the input side of the inverter 7 in parallel therewith. Primary windings 81 and 82 of a 3-phase induction motor 8 are connected to the outputs of the inverters 6 and 7, respectively. As the breaker 2 is turned on, the filter capacitors 4 and 5 are charged with voltages which are obtained by dividing the DC voltage of the DC power supply at a ratio of 1:1. The 3-phase inverters 6 and 7 convert the divided D.C. voltage into 3-phase A.C. voltages and apply these voltages to the corresponding primary windings 81 and 82 of the 3-phase induction motor 8. A rotating magnetic flux formed by the current in the primary winding 81 and a rotating magnetic flux formed by the current in the primary winding 82 are magnetically combined so as to form a composite rotating magnetic flux. A rotor (not shown) of the 3-phase induction motor 8 is rotated by torque generated by the inter-action between the composite rotating magnetic flux and secondary current which is induced in a secondary circuit (not shown) of the motor.

In FIG. 1, a character I represents the current flowing in the filter reactor 3, $E_{c1}$ represents the voltage between both terminals of the filter capacitor 4, $E_{c2}$ represents the voltage between both terminals of the filter capacitor 5, $I_1$ and $I_2$ represent respective D.C. currents flowing into the 3-phase inverters 6 and 7, $P_1$ represents the output of the 3-phase inverter 6 and $P_2$ represents the output of the 3-phase inverter 7. It is assumed here that a condition $P_1 > P_2$ exists due to unbalance of characteristics between two 3-phase inverters 6 and 7 and the unbalance of impedance between to primary windings 81 and 82. Neglecting the internal losses of the 3-phase inverters 6 and 7, the following two conditions are met in the initial state of the motor.

$$P_1 = E_{c1} \times I_1 > P_2 = E_{c2} \times I_2 \qquad (1)$$

$$P_1 + P_2 = (E_{c1} + E_{c2}) \times 1 \qquad (2)$$

If the condition $E_{c1} = E_{c2}$ is met in the initial state, the following conditions are derived from the formulae (1) and (2).

$$I_1 > I > I_2$$

Therefore, the voltage $E_{c2}$ across the filter capacitor 5 increases while the voltage $E_{c1}$ across the filter capacitor 4 decreases. The decrease in the voltage $E_{c1}$ and increase in the voltage $E_{c2}$ continue till the condition of $I_1 = I_2 = I$ is obtained, and a balance is attained when the following condition is met.

$$P_1 = E_{c1} \times I > E_{c2} \times I = P_2$$

This causes an unbalance between the D.C. voltages applied to the 3-phase inverters 6 and 7, resulting in an unbalance between the outputs of the 3-phase inverters 6 and 7.

Thus, in the conventional variable-speed driving system, unbalance between the outputs of the 3-phase inverters 6 and 7 is often caused by various reasons such as difference in the characteristics of components such as switching devices (not shown) in the parallel 3-phase inverters 6, 7 and unbalance of impedance between two primary windings of the 3-phase induction motor 8. This unbalance of the outputs often causes accidents such as breakdown of the components of the 3-phase inverters.

SUMMARY OF THE INVENTION

Accordingly, an object of the present invention is to provide a variable-speed driving system which can equalize outputs of both 3-phase inverters regardless of any difference in the characteristics between these 3-phase inverters and regardless of the control mode, thereby preventing breakdown of the 3-phase inverters by over-voltage.

To this end, according to the present invention, there is provided a variable-speed driving system for driving at least one 3-phase induction motor each having two primary windings, with change-over of the operation mode between a variable voltage/variable frequency operation mode and a constant voltage/variable frequency mode, the system being capable of potential-dividing a D.C. power from a D.C. power supply into two D.C. powers, converting these two D.C. powers into respective 3-phase A.C. powers and supplying the 3-phase A.C. powers to the respective primary windings of the 3-phase induction motor, the system comprising: power conversion means having one input and two outputs, the power conversion means being capable of potential-driving the D.C. power from the power supply into two D.C. powers, converting said two powers into 3-phase A.C. powers in a variable modulation manner respectively, and delivering one of the 3-phase A.C. powers from one of said outputs to each one of the primary windings and the other of the 3-phase A.C. powers from the other of its outputs to the other each of the primary windings; voltage adjusting means for adjusting the voltages of the D.C. powers formed by the potential-division; voltage difference detection means for detecting the voltage difference between the D.C. powers formed by the potential division; and control means operative in accordance with the voltage difference detected by the voltage difference detection means, so as to control a modulation factor in the power conversion means when the operation mode is the variable voltage/variable frequency mode and to control the voltage adjusting means when the operation mode is the constant voltage/variable frequency mode, thereby equalizing two 3-phase A.C. powers which are output from the power conversion means.

Thus, according to the invention, the modulation factor in the power conversion means is controlled during operation in the variable-voltage/variable frequency mode, whereas, during operation in the constant-voltage/variable frequency mode, the voltage adjusting means is controlled, so that the levels of two 3-phase A.C. power output from the power conversion mans are equalized, whereby occurrence of over-voltage due to unbalance of the 3-phase A.C. power is prevented to eliminate accidental breakdown in the power conversion means which may otherwise be caused by such an over-voltage.

The above and other objects, features and advantages of the present invention will become clear from the following description of the preferred embodiments when the same is read in conjunction with the accompanying drawings.

DESCRIPTION OF THE PREFERRED EMBODIMENT

An embodiment of the present invention will be described with reference to the drawings.

Figure 2:
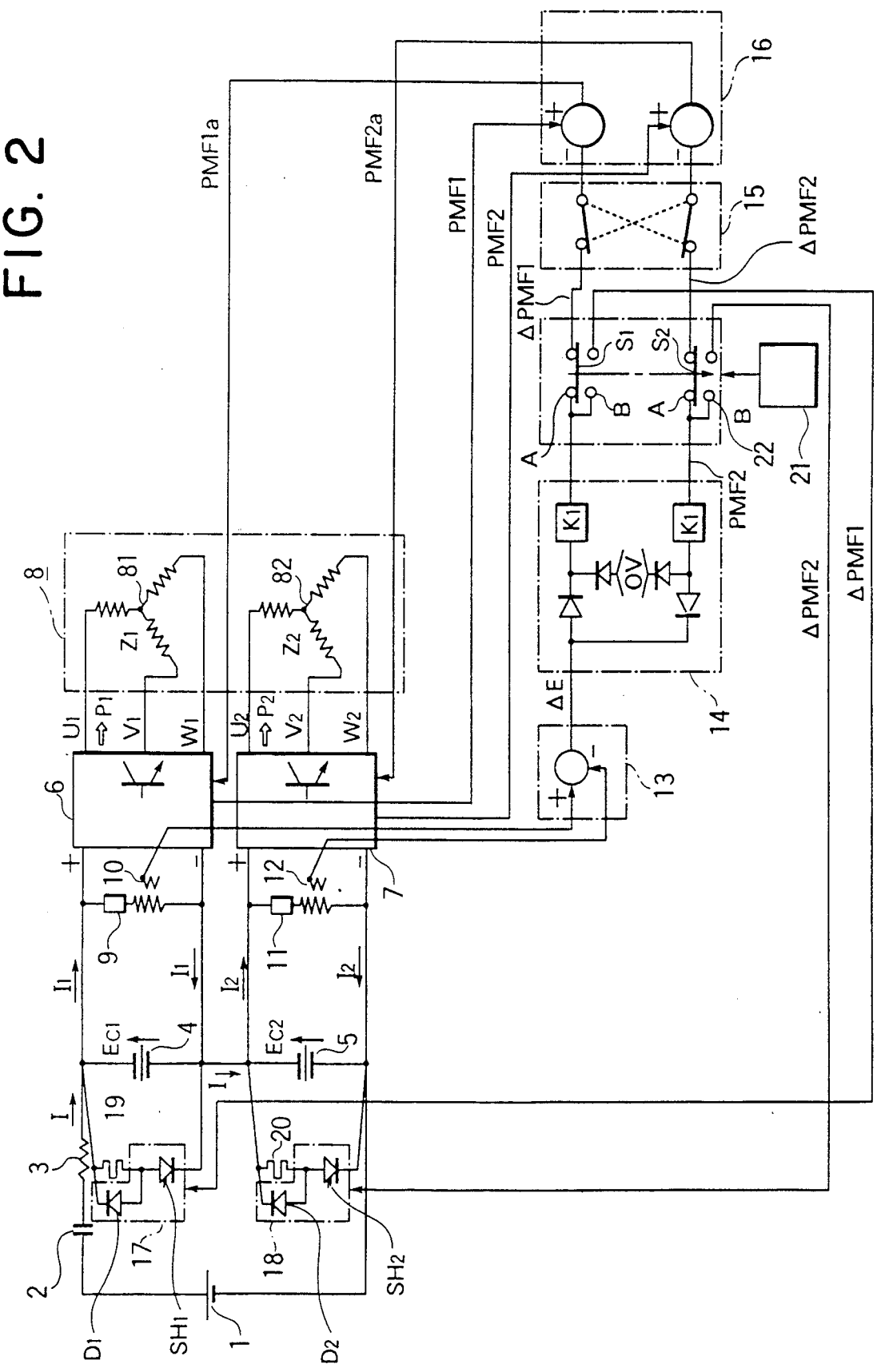
FIG. 2 is a circuit diagram showing the construction of a main circuit in variable-speed driving system in accordance with the present invention.

Referring to FIG. 2, a 3-phase inverter 6 has D.C. input terminals between which is connected a series circuit including a resistor 9 and a voltage sensor 10. Similarly, a series circuit including a resistor 11 and a voltage sensor 12 is connected between D.C. input terminals of the 3-phase inverter 7. A voltage difference detection circuit 13 receives outputs from both voltage sensors 10 and 12 and detects the difference $\Delta E$ between these outputs and delivers the same to an absolute value computing circuit 14. The output from the absolute value computing circuit 14 is delivered through a control output switching circuit 22 and a change-over switch 15 to a subtracting circuit 16. A chopper circuit 17 is connected parallel to the filter capacitor 4 through a discharge resistor 19, while a chopper circuit 18 is connected parallel to the filter capacitor 5 through a discharge resistor 20. These chopper circuits 17 and 18 have diodes 17 and 18 and chopper elements $SH_1$ and $SH_2$, respectively, as illustrated.

Figure 1:
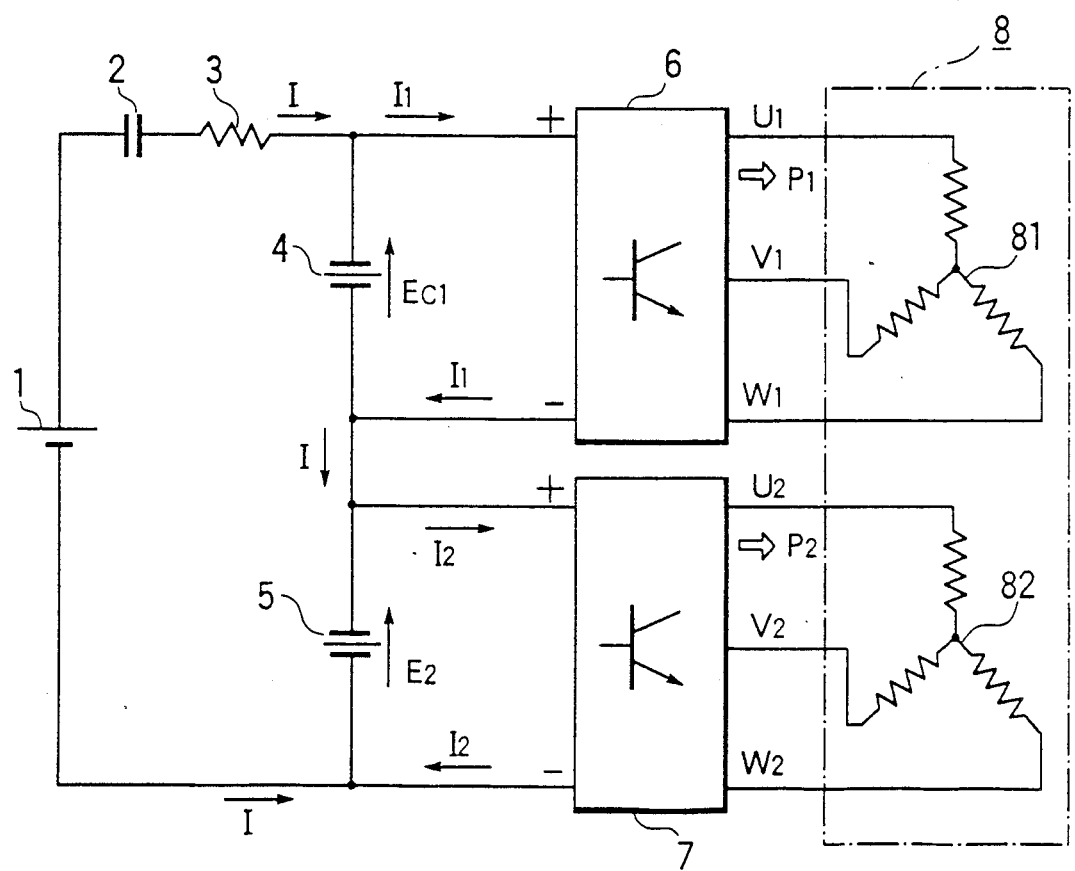
FIG. 1 is a circuit diagram showing the construction of a main circuit in a conventional variable-speed driving system.

When the system is operating in the variable voltage/variable frequency mode, a control mode judging circuit 21 delivers a switching command for switching the contacts $S_1$ and $S_2$ of the change-over circuit 22 to select terminals A as shown in FIG. 2, whereas, when the operation mode is the constant voltage/variable frequency control mode, the control mode judging circuit 21 delivers an instruction for switching the contacts $S_1$ and $S_2$ of the change-over circuit 22 to select terminals B. Other portions are materially the same as those in the known system shown in FIG. 1.

In FIG. 2, the following symbols represent the following factors.

$PMF1_a$: output from the subtracting circuit 16 which forms instruction to the 3-phase inverter 6.
$PMF2_a$: output from the subtracting circuit 16 which forms instruction to the 3-phase inverter 7.
PMF1: modulation factor of 3-phase inverter 6
PMF2: modulation factor of 3-phase inverter 7.

The basic operation of the variable-speed driving system shown in FIG. 2 is substantially the same as that of the known system explained before in connection with FIG. 1. It is assumed here that there is an unbalance, i.e., difference, between the impedances of the primary windings 81 and 82 of the 3-phase induction motor 8. More specifically, it is assumed here that a condition of $Z_1 > Z_2$ is met, where $Z_1$ and $Z_2$ represent impedances of the primary windings 81 and 82, respectively. When the 3-phase inverters 6 and 7 are activated, input currents $I_1$ and $I_2$, represented by the following formulae (3) and (4) are supplied to these inverters 6 and 7.

$$I_1 = K \times E_{c1}/Z_1 \tag{3}$$

$$I_2 = K \times E_{c2}/Z_2 \tag{4}$$

where, K is a constant.

Since the condition $Z_1 > Z_2$ exists as mentioned above, the following conditions is obtained when a condition $E_{c1} = E_{c2}$ is met in the initial state.

$$I_1 < I < I_2$$

As a result, the voltage $E_{c1}$ across the filter capacitor 4 increases, while the voltage $E_{c2}$ across the filter capacitor 5 decreases, thus creating a condition of $E_{c1} > E_{c2}$. These voltages are sensed by the voltage sensors 10 and 12, the outputs of which are delivered to the voltage differential detection circuit 13 which outputs the voltage difference $\Delta E$ as follows.

$$\Delta E = E_{c1} - E_{c2}.$$

The voltage difference $\Delta E$ is positive ($\Delta E > 0$), since in this state the condition of $E_{c1} > E_{c2}$ is met. Therefore, the absolute value computing circuit 14 produces and delivers a signal $\Delta PMF1$ which is obtained by amplifying the voltage difference $\Delta E$ by means of a positive constant circuit $K_1$.

$$\Delta PMF1 = K_1 \times E \tag{5}$$

$$\Delta PMF2 = 0 \tag{6}$$

When the 3-phase inverters 6 and 7 are operating in the power running mode, the change-over switch 15 is in a state shown by broken lines in FIG. 2. Therefore, the subtraction circuit 16 performs the following computation.

$$PMF1_a = PMF1 - \Delta PMF2 \tag{7}$$

$$PMF2_a = PMF2 - \Delta PMF1 \tag{8}$$

The following conditions are derived from the above formulae (5) and (6).

$$PMF1_a = PMF1 \tag{9}$$

$$PMF2_a = PMF2 - K_1 \times \Delta E \tag{10}$$

In general, the following relationship exists between the power modulation factor PMF and the voltage $E_c$ across the filter capacitor.

$$E_M = K_2 \times PMF \times E_c \tag{11}$$

where, $E_M$ represents the terminal voltage of the motor, while $K_2$ is a constant.

The voltages applied to each primary winding of the 3-phase electric motor 8 before the operation of the voltage differential detection circuit 13 and that after the operation of the same will be compared with each other.

The voltage applied to the primary winding 81 is as follows.

before operation: $E_{M1} = K_2 \times PMF1 \times E_c$ after operation: $E_{M1} = K_2 \times PMF1 \times E_c$.

Thus, no change is caused in the voltage applied to the primary winding 81.

On the other hand, the voltage applied to the other primary winding 82 is as follows.

before operation: $E_{M2} = K_2 \times PMF2 \times E_c$ after operation: $E_{M2} = K_2 \times (PMF2 - K_1 \times \Delta E) \times E_c$.

Thus, the voltage $E_{M2}$ applied to the primary winding 82 before the operation of the voltage difference detection circuit 13 is greater than that $E_{M2}$ after the operation of the same. The input power $P_2$ (output of inverter) to the 3-phase induction motor 8 in the state before the operation of the voltage difference detection circuit 13 and that in the state after the operation of the same are expressed as follows, respectively.

before operation: $P_2 = [K_2 \times PMF2 \times E_c]^2 / Z_2$ after operation: $P_2 = [K_2 \times (PMF2 - K_1 \times \Delta E) \times E_c]^2 / Z_2$.

Thus, the power $P_2$ obtained in the state before the operation of the voltage differential detection circuit 13 is greater than that $P_2$ in the state after the operation of the same.

Since the input power $P_2$ to the primary winding 82 of the 3-phase induction motor 8 decreases after the operation of the voltage differential detection circuit 13, the input power supplied to the 3-phase inverter 7 decreases if the losses in the 3-phase inverters 6 and 7 are neglected. Consequently, the input current $I_2$ decreases, while the voltage $E_{c2}$ across the filter capacitor 5 increases.

The described operation continues as long as the difference voltage $\Delta E$ is being detected by the voltage differential detection circuit 13.

Consequently, the condition of $E_{c1} = E_{c2}$ is obtained thus arranging a balance between the voltages input to both inverters.

The described method for controlling the output of 3-phase inverter through varying modulation factor of the inverter is effective only in the variable voltage/variable frequency mode of operation. Namely, this method cannot be applied when the operation mode is the constant voltage/variable frequency control mode, since in such a case the pulse width is fixed to a value corresponding to 120° electric angle.

In this embodiment, therefore, the modulation factor control described above is conducted when the operation mode (control mode) is the variable voltage/variable frequency control mode, whereas, when the operation mode is the constant voltage/variable frequency control mode, the conduction ratios of the chopper circuits 17 and 18 are controlled in accordance with the voltage difference $\Delta E$.

More specifically, during operation in the constant voltage/variable frequency mode, an instruction is given from the control mode judging circuit 21 to the change-over circuit 22 so as to set the contacts $S_1$ and $S_2$ to the terminals B, whereby the voltage difference $\Delta E$ is delivered to the chopper circuits 17 and 18 as the control amount. When the voltage difference is greater than zero, i.e., when the condition $\Delta E > 0$ is met, the chopper circuit 17 is kept "on" so as to allow the filter capacitor 4 to discharge through the resistor 19, until the condition $E_{c1} = E_{c2}$ is obtained. Similarly, when the voltage difference is less than zero, i.e., when the condition $\Delta E < 0$ is met, the chopper circuit 18 is kept "ON" so as to allow the filter capacitor 5 to discharge through the resistor 20, until the condition $E_{c1} = E_{c2}$ is obtained.

Although only one 3-phase induction motor is used in the described embodiment, the driving system of the present invention can be used simultaneously for two 3-phase induction motors. In such a case, the primary windings 81 of both 3-phase induction motors are connected to the 3-phase inverter 6, while the primary windings 82 of these motors are connected to the 3-phase inverter 7.

It is also to be understood that the invention can be applied to 3-phase induction motors having three or more primary windings, although the motor in the described embodiment has two primary windings. When the invention is applied to a 3-phase induction motor having three or more primary windings, it is necessary to employ a corresponding number of 3-phase inverters. In addition, the construction of the modulation factor and conduction rate change-over means is somewhat complicated. The basic construction, however, is the same as that in the described embodiment.

As has been described, the variable-speed driving system of the present invention operates to control the modulation factor of the 3-phase inverters when the operation mode is the variable voltage/variable frequency mode, whereas, when the operation mode is the constant voltage/variable frequency mode, it operates the chopper circuits so as to control the conduction ratio of the chopper circuits. Thus, the variable speed driving system of the present invention can equalize the outputs of both 3-phase inverters so as to avoid generation of over-voltage attributable to an unbalance of the inverter outputs and, hence, to eliminate accidental breakdown of the components of the inverters, thus offering a greater advantage over the known systems.

What is claimed is:

1. A variable-speed driving system for driving at least one 3-phase induction motor each having two primary windings, with change-over of an operation mode between a variable voltage/variable frequency operation mode and a constant voltage/variable frequency mode, said system being capable of potential-dividing a D.C. power from a D.C. power supply into two D.C. powers, converting these two D.C. powers into respective 3-phase A.C. powers and supplying said 3-phase A.C. powers to the respective primary windings of said 3-phase induction motor, said system comprising:

power conversion means having one input and two outputs, said power conversion means being capable of potential-dividing the D.C. power from said power supply into two D.C. powers, converting said two powers into 3-phase A.C. powers in a variable modulation manner respectively, and delivering one of said 3-phase A.C. powers from one of said outputs to each one of said primary windings and the other of said 3-phase A.C. powers from the other of its outputs to the each other of said primary windings;

voltage adjusting means for adjusting the voltages of said D.C. powers formed by said potential-division;

voltage difference detection means for detecting the voltage difference between the D.C. powers formed by the potential division; and control means operative in accordance with the voltage difference detected by said voltage difference detection means, so as to control a modulation factor in said power conversion means when the operation mode is said variable voltage/variable frequency mode and to control said voltage adjusting means when the operation mode is said constant voltage/variable frequency mode, thereby equalizing two 3-phase A.C. powers which are output from said power conversion means.

2. A variable-speed driving system according to claim 1, wherein said power conversion means includes first and second filter capacitors connected in series across said power supply so as to potential-divide said D.C. power of said D.C. power supply; and first and second variable-modulation 3-phase inverters connected across said first and second filter capacitors, respectively, so as to convert the D.C. powers formed by the filter capacitors into respective 3-phase A.C. powers and delivering said A.C. powers to the respective primary windings of said 3-phase induction motors, wherein said voltage adjusting means includes a series connection of a discharge resistor and a first chopper circuit connected across said first filter capacitor, a series connection of a discharge resistor and a second chopper circuit connected across said second filter capacitor, wherein said voltage difference detection means includes two series circuit of a resistor and a voltage sensor connected across said first and second 3-phase inverters respectively, a voltage difference detection circuit for receiving outputs from said voltage sensors to determine the voltage difference therebetween, and an absolute value computing circuit capable of generating a signal proportional to an absolute value of the voltage difference determined by said voltage difference detection circuit, and wherein said control means includes a control mode judging circuit capable of generating a change-over command for change-over between said variable voltage/variable frequency mode and said constant voltage/variable frequency mode, and a circuit operative in accordance with said change-over command so as to deliver to the inverter receiving a lower input voltage a control signal for reducing the modulation factor by an amount corresponding to said voltage difference when the operation mode is the variable voltage/variable frequency mode, and so to turn on said chopper circuit connected to the inverter receiving a higher input voltage when the operation mode is the constant voltage/variable frequency mode, thereby equalizing said 3-phase A.C. powers which are output from said first and second 3-phase inverters.

3. A variable speed driving system according to claim 2, wherein said control means includes a control mode judging circuit capable of generating a change-over command for change-over between said variable voltage/variable frequency mode and said constant voltage/variable frequency mode, an output change-over circuit operative in accordance with said change-over command so as to deliver the signal proportional to said voltage difference derived from said absolute value computing circuit to one of said first and second 3-phase inverters when the operation mode is the variable voltage/variable frequency mode and to one of said first and second chopper circuits when the operation mode is the constant voltage/variable frequency mode, and substracting circuits for receiving signals indicative of the modulation factors of said first and second 3-phase inverters, said subtracting circuits, when the operation mode is the variable voltage/variable frequency mode, being producing a control signal by subtracting the value of the voltage difference proportional to the absolute value of the voltage difference from the value of a signal representative of the modulation factor of the 3-phase inverter receiving a lower input voltage and feeding back said control signal to said 3-phase inverter receiving the lower input voltage, whereas, when the operation mode is the constant voltage/variable frequency mode, said chopper circuit connected to the 3-phase inverter receiving a higher input voltage is turned on by said signal representative of the absolute value of the voltage difference derived from said output change-over circuit, so that said filter capacitor connected to said chopper circuit which is turned on is allowed to discharge through said discharge resistor.

4. A variable-speed driving system according to claim 2, wherein said power conversion means further includes a series circuit of a breaker and a filter reactor, said series circuit being connected between said D.C. power supply and the series circuit including said first and second filter capacitors.

* * * * *

UNITED STATES PATENT AND TRADEMARK OFFICE
CERTIFICATE OF CORRECTION

PATENT NO. : 4,999,561

DATED : March 12, 1991

INVENTOR(S) : Kaga et al.

It is certified that error appears in the above-identified patent and that said Letters Patent is hereby corrected as shown below:

On the title page:

In item [57] Abstract, line 6, after "respective" insert --primary--.

Column 8, line 29, after "value" insert --of said signal proportional to the absolute value of--.

Column 8, line 29-30 delete "Proportional to the absolute value of the voltage difference"

Signed and Sealed this

Twelfth Day of October, 1993

*Attest:*

BRUCE LEHMAN

*Attesting Officer*     *Commissioner of Patents and Trademarks*